Aug. 16, 1966            A. ADEM            3,267,382

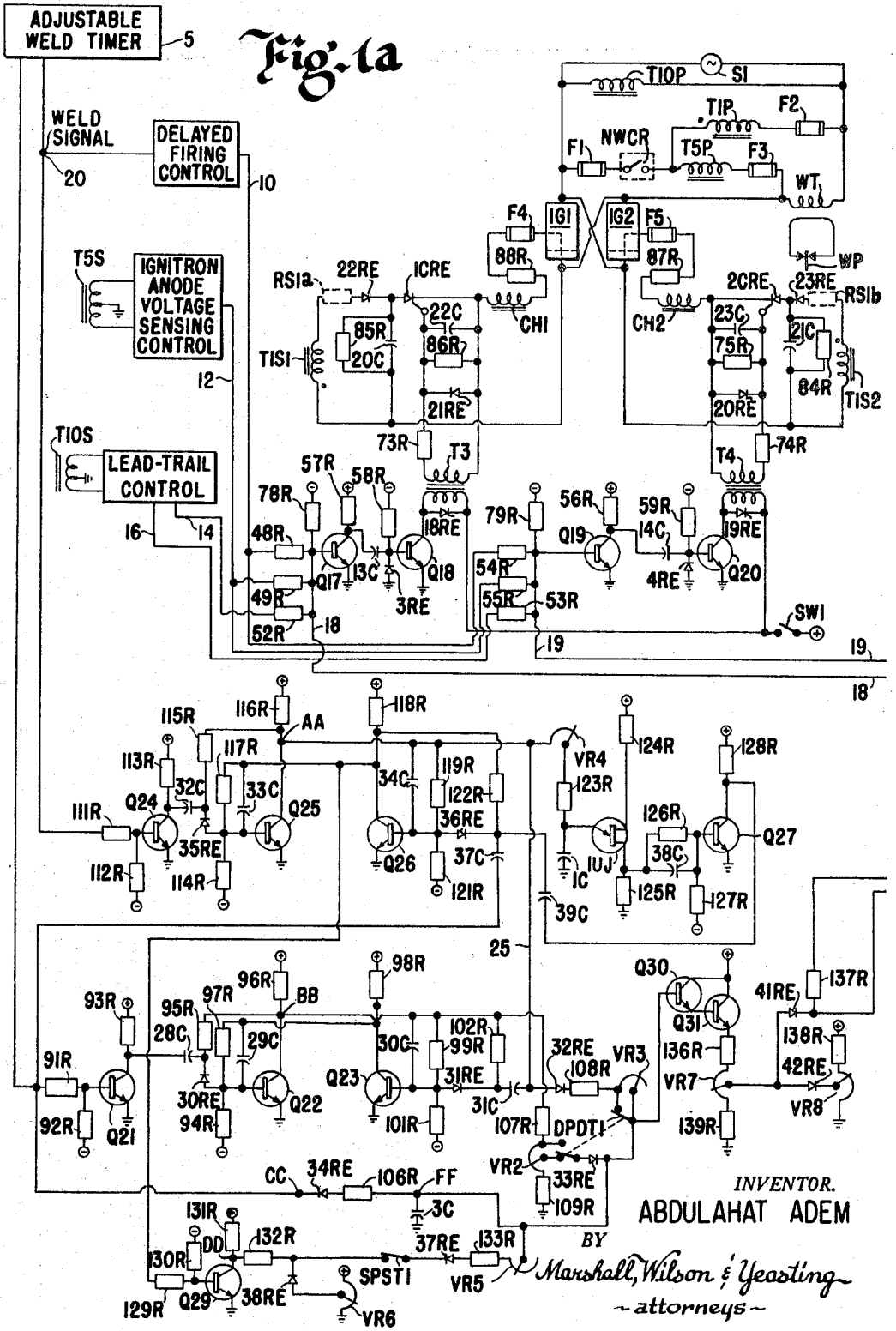

SLOPE AND HEAT CONTROL CIRCUIT WITH INHIBIT MEANS

Filed Sept. 16, 1963            2 Sheets-Sheet 2

INVENTOR.
ABDULAHAT ADEM
BY Marshall, Wilson & Yeasting
—attorneys—

3,267,382
SLOPE AND HEAT CONTROL CIRCUIT WITH
INHIBIT MEANS
Abdulahat Adem, Detroit, Mich., assignor to Weltronic
Company, Southfield, Mich., a corporation of Michigan
Filed Sept. 16, 1963, Ser. No. 309,064
13 Claims. (Cl. 328—72)

This invention relates to welding apparatus and more particularly to an improved welding control circuit to be used therewith.

In many cases because of the types of materials being welded, or because the materials being welded are surface coated, or to prevent welding tip splatter, it has been found desirable to provide a weld current which is variable over the weld cycle, instead of initially starting with and maintaining a constant high weld current for the entire cycle. Accordingly it is customary to provide various intervals of changing weld current in a given weld cycle. The time during which the weld current is continuously increasing from the beginning of the weld current flow is called Up-Slope time. The duration of the Up-Slope time may be varied in accordance with the above-mentioned considerations, as well as other well-known factors. The Up-Slope time is followed by the remainder of the Weld-Heat time during which interval substantially full weld current will flow. Finally it has been found that a rapid cooling of the weld, as for example by the instantaneous removal of a weld current at the termination of the Weld-Heat time, results in a cracking of the weld nugget, as well as other undesirable characteristics. Therefore, in order to avoid material cracking, as well as to condition the weld area, it has been found desirable to gradually reduce the heat applied to the work piece to a final post-heat level. The time during which the welding current continuously decreases from the end of Weld-Heat time is defined as the Down-Slope time. The desirability of having a welding control circuit which provides a varying adjustable current comprising an Up-Slope interval, a Weld interval, and a Down-Slope time interval over the entire weld cycle is therefore obvious. It is also obvious that a control circuit which is able to automatically provide repetitive operation after an initial predetermined setting would be most useful.

Heretofore it has been known to provide a varying adjustable current over the weld cycle by using a manually operable potentiometer for the Up and Down Slope shaping means. However this scheme has proved to be ineffective because of the lack of repetitivity between succeeding weld cycles, as well as because of the inability of the operator to know exactly when the desired number of cycles of Up or Down Slope time have occurred.

It is an object of this present invention to improve the control and shaping of the weld current cycle of resistance welding equipment.

It is another object to provide a simple, fast acting and accurate heat shaping control circuit.

It is another object to simplify the equipment needed for varying the duration of either the Up or Down Slope time of a weld cycle.

It is yet another object to provide slope control circuitry which is capable of yielding accurate, repetitive operation after an initial predetermined setting.

A particular object is to accomplish the afore-mentioned objects in a control circuitry utilizing a minimum number of elements and utilizing solid state devices as the active control elements.

In accordance with one illustrative embodiment of the invention, control of the heat generated at the work piece by unidirectional current conductive devices, such as ignitrons, supplying current to a welding transformer primary from a source of electrical energy of alternating polarity is accomplished by Slope-Heat control circuitry employing solid state devices as the active control elements. A separate-excitation firing circuit for each ignitron comprising a source of energy, such as a charged capacitor, and a controllable means, such as a silicon controlled rectifier, is effective when actuated for applying a pulse of actuating energy to the igniter electrode of the ignitron. In turn, the controllable means is responsive to a pulse of energy in a circuit which can be inhibited by a signal from any of a plurality of subsidiary control circuits. One such control circuit operates in synchronism with the alternating source and is effective during each half cycle to initiate a period of inhibition which can occur any time, from slightly in advance of the beginning of each half cycle, and continuing this period of inhibition for an adjustable interval extending into the half cycle. The duration of the inhibition interval is controlled by the Slope-Heat control circuitry, which in turn is presettable to provide a varying adjustable current over the length of the weld cycle.

One feature of the invention resides in continuously adjusting the firing point of the ignitron contactor during a predetermined initial interval to achieve a continuously decreasing inhibit interval.

Another feature of the invention involves the automatic initiation of a weld heat level upon the termination of the Up-Slope interval, and the maintenance of that level for an interval during which time the firing of the ignitron contactor occurs at the same point for succeeding half cycles of the supply voltage.

Another feature comprises continuously adjusting the firing point of the ignitron contactor over a predetermined interval to achieve a continuously increasing inhibit interval.

The above and additional objects of this invention together with the features will be more fully appreciated from the following detailed description when read with reference to the accompanying drawings in which:

FIGURES 1a and 1b are schematic circuit diagrams of a resistance welding circuit and its control circuit utilized in one form of this invention and further shows certain controls in block diagram form;

Figure 3:
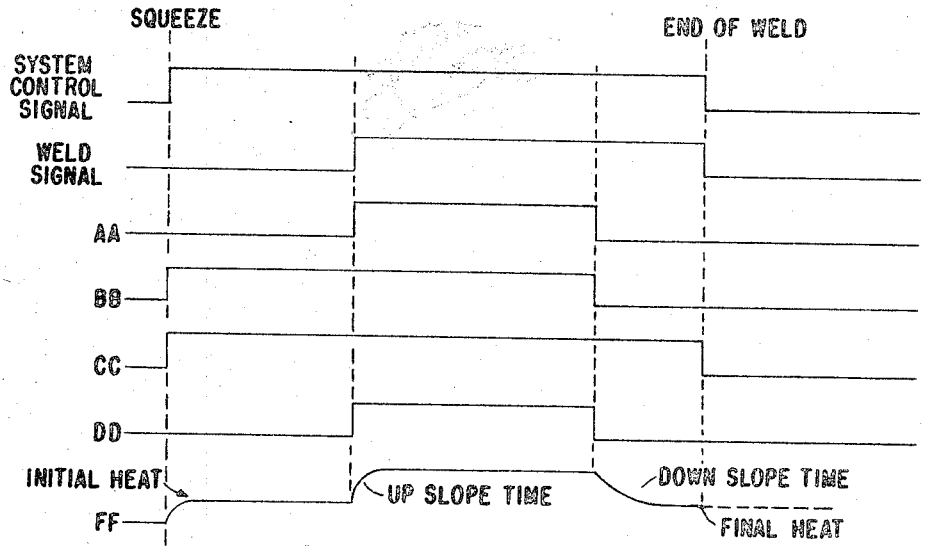
FIGURE 3 is a timing diagram showing the waveforms generated at selected points of the slope control circuitry as shown in FIGURE 1.

The welding control under consideration here has been applied to a complete firing system for an ignitron controlled welder as disclosed in George O'Neal, Jr. United States patent application Serial No. 271,948, which was filed April 10, 1963 and is entitled "Control Apparatus." Accordingly, in the interest of brevity, a substantial portion of the controls disclosed in that application are incorporated herein by reference and are represented in the drawing by suitably labeled blocks including the "delayed firing control," the "ignitron anode voltage control" and the "lead-trail control."

For convenience of illustration, the transformer windings have been illustrated in the drawing in a way to best illustrate the function of those transformers and consequently the primary and secondary windings are shown separated. Common prefix designations have been employed in each case, however, to permit identification of the secondary windings with their associated primary windings. Additionally, in the drawings, the sources of direct voltage have been indicated by a circle bearing a sign indicative of the polarity of the source. It is to be understood that in each case the other terminal of the source is assumed to be connected to ground. For convenience and clarity, voltage values have been referred to in the following description. It is to be understood that they are but representative.

Figure 1B:
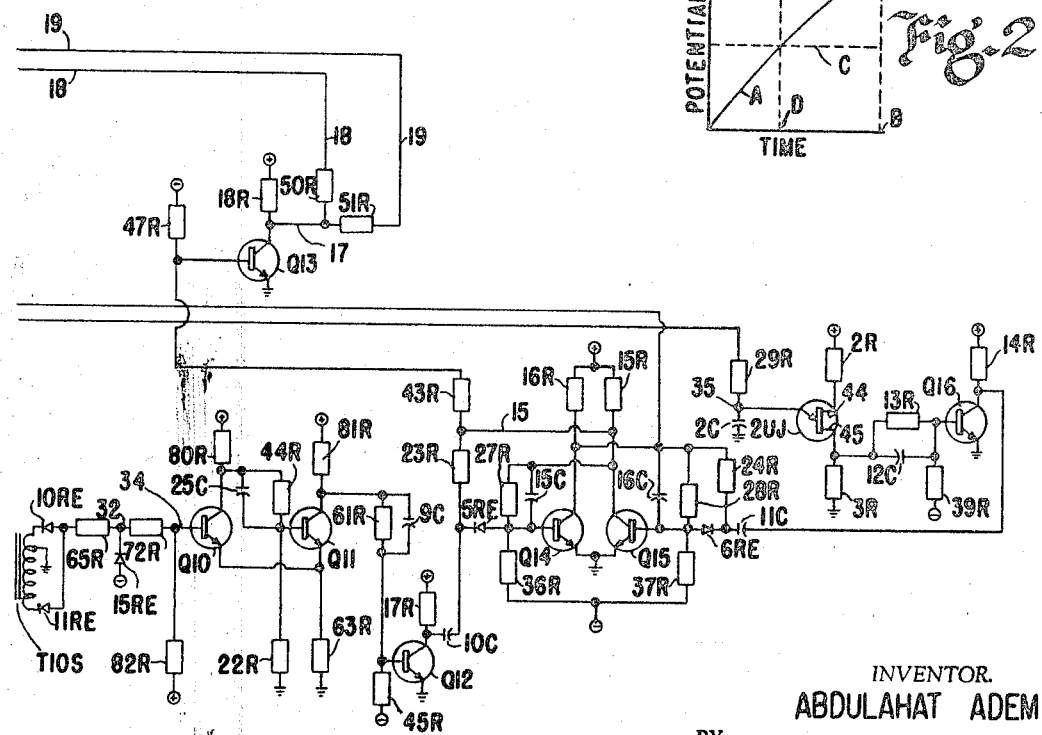

In general, the circuits illustrated in FIGS. 1a and 1b, which figures are intended to illustrate a complete system and can be interconnected by aligning the right most portion of FIG. 1a with the left most portion of FIG. 1b so that corresponding leads 18 and 19 will be in alignment, comprise a pair of ignitrons IG1 and IG2 (or other controlled contactor means) for selectively connecting a source of energy S1 to a welding transformer WT for controlling the application of energy to a work piece WP which is to be welded. The ignitrons IG1 and IG2 are controlled by individual firing circuits including controlled rectifiers 1CRE and 2CRE. Those firing circuits are operated under the control of driving circuits including transistors Q17 and Q18, and transistors Q19 and Q20. Those driving circuits are, in turn, controlled by four separate circuits including a delayed firing system, an ignitron anode voltage sensing system, a lead-trail control circuit, a heat control circuit comprising transistors Q10 to Q16, and a slope control circuit comprising transistors Q21 to Q31. The heat control circuitry is settable to vary the switching point for welding current on the A.C. cycle. The slope control circuitry is initially settable by differentially positionable circuit means to result in a further shaping of the heat applied to the work piece during a weld cycle in accordance with predetermined criteria.

In the present commercial practice, ignitrons, or the like, customarily employed with so-called anode firing circuits in which the voltage applied across the ignitron also serves as the energizing or plate voltage for the controlling or firing device, such as a thyratron, in the firing circuit. In such systems, the peak line voltage, which can be high due to transients, is in large part applied directly across the firing device which has made it difficult to satisfactorily adapt the system to the use of solid-state firing devices, in view of their sensitivity to voltage transients. If the rate of voltage rise is sufficient, as it can well be with line-voltage transients, the firing device can, improperly, fire even though there be no input signal. In the present arrangement, the problems arising from the transient-voltage sensitivity characteristics of solid-state devices, such as silicon controlled rectifiers, are effectively solved by isolating the firing devices from the line. Specifically, a separate-excitation circuit is employed and filtering means are employed between the source of voltage and the device to suppress transient voltage peaks. As a further means, additional filtering means are or may be provided between that device and the ignitron to control the rate of increase of the igniter current.

Automatic slope regulation to achieve a regulation of the heat generated at the work piece is achieved by establishing an initial biasing level in a timing circuit to prevent conduction of the ignitron contactors until predetermined points of either half-cycle of the alternating polarity source. The initial biasing level is automatically varied at different intervals of the weld cycle in accordance with the preselected Heat-Slope characteristic desired. Accordingly the initial biasing level established in the timing circuit is set at an original low value and is continuously adjusted upwardly during the Up-Slope interval to permit a continuously increasing generation of heat or current to flow through the work piece from an original low value. During the remainder of the Weld-Heat time a steady biasing level is maintained in the timing circuit controlling the switching of the welding current to insure that like amounts of welding current will be switched through each of the ignitrons. At a predetermined point in the weld cycle, which indicates the commencement of the Down-Slope interval thereof, the biasing level at the timing circuit will be continuously decreased to progressively decrease the portion of the cycle during which welding current flows. This interval may be followed by an additional interval referred to as post-heat time during which time a constant, small magnitude bias is maintained at the timing circuit to permit a low final welding current to flow for the remainder of the weld cycle.

The two ignitrons IG1 and IG2 are connected in back-to-back or anti-parallel relationship between the source S1 and the primary winding of the welding transformer WT, in a manner well known in the art. The operation of these ignitrons is controlled by firing circuits including devices 1CRE and 2CRE. To effectively preclude dangerous premature firing of the ignitrons, switch NWCR is actuated to indicate that the apparatus is prepared for welding. In a common practice, welder control circuits include a timer having a relay, often referred to as the "no-weld control relay," which is actuated upon initiation of the squeeze interval provided the apparatus is otherwise in condition to weld, and it is contemplated that the switch NWCR illustrated in FIG. 1 of the drawing may, and normally will be, a contact of that or of a counterpart relay. The no-weld-control relay may well not operate at a point of zero line voltage and could result in a transient signal which would improperly actuate the firing circuit. The illustrated circuits obviate this possible malfunctioning.

When switch NWCR is closed, a circuit is completed from the source S1, through that switch and through fuses F1 and F2 to energize the transformer primary winding T1P, which is inductively coupled to secondary windings T1S1 and T1S2 of that transformer. Secondary windings T1S1 and T1S2 are connected in out-of-phase relationship and the phase relationships of the several windings of that transformer are indicated by the dot placed adjacent one end of each of the windings T1P, T1S1 and T1S2 to denote those winding ends which are of the same polarity at a given instant.

When the voltage across winding T1P is such that the left-hand end of that winding is positive relative to the right-hand end, for example, the voltage induced across secondary winding T1S2 is such that its upper end is positive relative to its lower end. Under that condition, current flows in a circuit including resistor RS1b and rectifier 23RE to charge capacitor 21C so that its upper electrode becomes positive relative to its lower electrode. As will be seen, the energy stored by capacitor 21C is utilized to fire ignitron IG2. Charging resistor RS1b may be provided as a separate element, but in a constructed embodiment of the invention, the effective resistance of the secondary winding T1S2 was found to be adequate and resistor RS1b is illustrated in dotted lines to connote that it represents the internal resistance of that winding.

It will be observed that during this same half cycle, the polarity of the voltage across secondary winding T1S1 is such that rectifier 22RE blocks current flow and hence capacitor 20C does not charge during this half cycle. However, during the subsequent half cycle, in which the polarity is reversed, capacitor 20C is charged in a manner similar to that above described in connection with capacitor 21C, in preparation for the firing of ignitron IG1.

Thus, at the end of one full cycle of the current from source S1 following the operation of switch NWCR, both capacitors 20C and 21C are charged in preparation for the operation of the system. Until they charge, the firing circuits cannot actuate the ignitrons. This one-cycle delay serves as a safety measure to insure that the welding electrodes will have engaged the work piece before welding current is applied to the welding transformer. In the customary timers, squeeze time must be initiated before switch NWCR will close and the necessity of charging capacitors 20C and 21C in order to enable the firing circuits to fire the ignitrons IG1 and IG2 requires that the squeeze time be at least one cycle in duration.

In the preferred arrangement, capacitors 20C and 21C are made sufficiently large to store a substantial amount of energy which may be abruptly discharged through the input circuits of the ignitrons. Once those capacitors are charged, this energy is available for application to those circuits, but cannot be so applied until the control rectifier devices 1CRE and 2CRE have a suitable gating potential applied to their control electrodes or gates.

Means are provided for applying gating pulses to the silicon controlled rectifier devices 1CRE and 2CRE in selectable timed relation to the voltage applied to the anodes of the ignitrons. When the gating signal is applied to controlled rectifier 2CRE (during the half cycle of the source voltage in which the anode of ignitron IG2 is positive relative to its cathode), that rectifier is rendered conductive to establish a discharging path for capacitor 21C through that rectifier, inductor or choke CH2, resistor 87R, fuse F5, through the igniter-cathode path in tube IG2 and back to capacitor 21C. In the preferred arrangement, capacitors 20C and 21C are preferably of substantial capacitance (such as 20 microfarads) so that a substantial amount of energy can be delivered to the input circuits of the ignitrons. It is a characteristic of the preferred controlled rectifiers 1CRE and 2CRE that when conduction is initiated by virtue of the application of an input signal to their gates, the termination of the gating pulse will not in and of itself terminate conductivity of those devices.

In response to the signal applied to the input circuit of ignitron IG2, that ignitron will conduct between its anode and cathode, producing energization of the welding transformer WT from the source S1 and a resultant application of a pulse of energy to the work piece WP. In a similar manner, ignitron IG1 is rendered conductive at a selectable point in that half cycle during which its anode is positive relative to its cathode to similarly energize transformer WT to apply a pulse of energy to the work piece WP.

It will be observed that the firing energy storage means, such as capacitor 21C, together with the resistance in its charging circuit, such as the illustrated internal resistance RS1b of transformer winding T1S2, constitute a resistance-capacitance low-pass filter or integrating network. As a result, if the line voltage abruptly and transiently changes, tending to induce a transient voltage peak across secondary winding T1S2, that resistance-capacitance network will effectively suppress the voltage peak from appearing at the controlled rectifier device 2CRE and effectively preclude any such transient from producing a sufficient rate of change of current to cause that device improperly to become conductive.

It will further be noted that the circuit including choke CH2 and the resistance in the discharging circuit for capacitor 21C, including resistor 87R, constitute a filter for limiting the rate of change of the discharge current of capacitor 21C so as to limit the magnitude of the current in the input circuit of the ignitron.

Resistors 84R and 85R, which are connected in parallel with capacitors 21C and 20C, respectively, are preferably of sufficiently large resistance so that they do not significantly affect the normal operation of the circuit. In a practical embodiment, those two resistors were selected to have a value of about 50,000 ohms so that the network including the associated capacitor had a time constant of one second, which is large relative to the normal interval between the charging of the capacitor and the time at which the firing circuit will be triggered to apply the pulse of energy to the ignitron. However, at the termination of the operation, when switch NWCR is opened, those resistors serve to discharge their associated capacitor as a safety measure.

The gate signals for the controlled rectifier devices 1CRE and 2CRE are applied through pulse transformers T3 and T4, respectively. Any pulse appearing across the secondary winding of transformer T4, for example, which is of a polarity such that the left-hand end of that winding is positive relative to the right-hand end, is dissipated through rectifier 20RE and resistor 74R. A pulse of the opposite polarity is applied to the input or gate circuit of controlled rectifier 2CRE via resistor 74R to cause that device to apply a discharge pulse from capacitor 21C to the input circuit of ignitron IG2, as above described. The network comprising capacitor 23C and resistors 74R and 75R are elements of a circuit for filtering high-frequency spurious transients and for effectively preventing improper actuation of the controlled rectifier device by transients. The gating pulses applied through transformer T4 are of sufficient magnitude to produce gating of the device despite this filtering or desensitizing network. The other firing circuit operates in a similar manner.

The application of pulses to the pulse transformers T3 and T4 is controlled by the driving circuit comprising transistors Q17 and Q18 and the driving circuit comprising transistors Q19 and Q20, respectively. These driving circuits are controlled by a delayed firing system via conductor 10, by an ignitron anode voltage sensing system via a conductor 12, by a lead-trail control circuit which is connected to the two driving circuits via leads 14 and 16, respectively, and by a heat control circuit via conductor 17. As will be seen, in the illustrated arrangement, each of these leads may be at either of two selected voltages. In the illustrated arrangement these have been selected to be a positive voltage (such as positive 12 volts) and ground.

Conductor 10 is connected to the bases of transistors Q17 and Q19 through resistors 48R and 54R, respectively; conductor 12 is connected to the bases of those transistors through resistors 49R and 55R, respectively; conductor 14 is connected to the base of transistor Q17 through resistor 52R; conductor 16 is connected to the base of transistor Q19 through resistor 53R; and conductor 17 is connected to the bases of transistors Q17 and Q19 via resistors 50R and 51R, respectively.

The emitters of transistors Q17 and Q19 are grounded and their collectors are connected to a source of positive potential through load resistors 57R and 56R, respectively. Negative biasing voltages are applied to the bases of those transistors through resistors 78R and 79R, respectively. If any one of the conductors 10, 12, 14 or 17 is at the noted positive potential (assumed to be 12 volts), transistor Q17 is biased effectively to saturation, and similarly, if any one of the conductors 10, 12, 16 or 17 is at the noted positive potential, transistor Q19 is biased effectively to saturation. These input networks therefore constitute, in effect, "or" gates under which if any one of the noted conductors associated with transistor Q17 or Q19 is at its positive potential or state, the associated transistor is biased effectively to saturation. Under that condition, the collector of that transistor is at a relatively low potential, herein assumed to be ground potential. However, at the instant that all of the noted conductors associated with the transistor concurrently reach the lower (ground) potential, the voltage at the base of that transistor drops sufficiently to render that transistor effectively non-conductive. For example, whenever all of the conductors 10, 12, 16 and 17 concurrently reach ground potential, transistor Q19 is rendered non-conductive and as a result a positive-going pulse is applied through the capacitor 14C to the base of transistor Q20. The emitter of transistor Q20 is grounded, and the collector is connected to a source of positive potential through the primary winding of transformer T4 and via switch SW1. The base is connected to a source of negative potential through resistor 59R. As a result of the application of the positive pulse to the base, transistor Q20 conducts current from the positive source through switch SW1, and through the primary winding of transformer T4 so that a pulse is induced in the secondary winding of that transformer. The shape and duration of the pulse which is applied to the base of transistor Q20, and hence the shape and duration of the pulse applied to the controlled rectifier device 2CRE via transformer T4 is controlled by means including resistor 56R, capacitor 14C and the resistance of the base of transistor Q20. Rectifier 4RE serves to prevent any substantial negative voltage from being applied to the base of transistor Q20. Rectifier 19RE serves to dissipate the voltage which is induced across the primary winding of transformer T4 upon the collapse of the magnetic field at the termination of conduction of transistor Q20 at the end of the pulse.

The driving circuit including transistors Q17 and Q18 operates in a similar fashion, producing a pulse of energy at transformer T3 in the event that and when the voltages on conductors 10, 12, 14 and 17 all reach their lower or ground potential. It will be noted that switch SW1 also controls the application of positive voltage to the collector of transistor Q18. This switch is provided as a further safety measure and preferably is a contact of or is controlled by the weld-no-weld switch customarily provided in resistance-welder timers and which must be closed in order for welding to proceed. Whenever that switch is open, the driving circuits are incapable of applying pulses through transformers T3 and T4 to the firing circuits.

The lead-trail circuit controls, via conductors 14 and 16, which of the two driving circuits and hence which of the two firing circuits can operate at any time, and alternately enables those circuits. This circuit is energized via a transformer, the primary winding T10P of which is illustrated to be connected across the source S1 and the secondary winding T10S of which appears at the lead-trail control block. When the upper terminal of the secondary winding T10S is positive with respect to the grounded center tap, which occurs when the left-hand terminals of source S1 and primary winding T10P are positive relative to their other terminals, current flows and the voltage drops from a positive level effectively to ground potential. This voltage is applied via conductor 14 and through resistor 52R to the base of transistor Q17 in the driving circuit associated with ignitron IG1. This is an enabling signal, which, other conditions met, will permit the firing circuit associated with ignitron IG1 to fire that ignitron, and it will be observed that this occurs during the half cycle in which the anode of ignitron IG1 is positive with respect to its cathode.

During the same half cycle, the lower terminal of transformer secondary T10S is negative with respect to ground and a positive voltage (e.g., 12 volts) is applied via conductor 16 and through resistor 53R to the base of transistor Q19 to disable that driving circuit and the firing circuit including controlled rectifier 2CRE to fire ignitron IG2.

The lead-trail control is arranged so that the potential on lead 14 is taken effectively to ground early in the half cycle of the line voltage, approaching quite closely the zero-degree point and remains at that voltage throughout essentially the complete half cycle. During the alternate half cycle the control causes the potential on lead 14 to be positive.

The lead-trail control operates continuously whenever the source S1 is connected so as alternately to enable during successive half cycles the firing circuits associated with ignitrons IG1 and IG2. In order to control when welding occurs and additionally to provide a means for effectively preventing firing during the first half cycle thereafter so as to prevent saturation of certain types of welding transformer cores, a delayed firing system is provided. The delayed firing system is actuated by a weld signal applied to conductor 20. An appropriate signal is conventionally available in a timer, 5, associated with present commercial welding equipment. This signal normally is applied when the timer has been set and desirably is synchronized with the voltage from source S1 so that the operating signal is both applied and removed at the zero degree points of the source voltage. In the illustrated arrangement, it is assumed that the weld signal applied to conductor 20 is at an appropriate positive value (e.g., 12 volts) and that the conductor 20 is grounded in the absence of a weld signal.

Since the weld signal appears at the beginning of the weld interval, the delayed firing circuit will be effective during the first half cycle of the line frequency, only, to prevent firing of either of the ignitrons for a preselected interval even though other elements of the circuits may indicate that welding may proceed. It is presently believed that the optimum delay period is 87½° after the zero degree point of the sine wave of the source S1 at which the weld signal is applied to conductor 20. This interval may be varied to accommodate variations in the power factor of the load by suitable adjustment controls. It is desirable, however, that the magnitude of the delay be quite precisely selectable so that the system provides extremely precise timing of the interval between the application of an appropriate potential to the weld line 20 (at the zero degree point) and the instant at which the firing circuits are enabled to fire during the first one-half cycle of operation.

It should again be noted that this delayed firing system does not necessarily cause firing of the ignitrons but merely establishes a minimum firing angle for the first half cycle, and that after the first half cycle of any weld, it is ineffective to interfere with the free selection of the firing points of the ignitrons.

The heat control circuit, comprising transistors Q10 through Q16, selectively controls the firing angles of the ignitrons IG1 and IG2 to control the percent heat and hence the magnitude of the energy delivered to the work piece WP. In general, the heat control has a capacity to produce firing of those ignitrons at any selected phase angle provided the other conditions established by the circuitry are met. Among those other conditions, of course, in the illustrated arrangement, is that if the heat control be set to fire the ignitrons at a phase angle less than a selected value in the order of 87½°, no such firing will occur during the first half cycle of the weld until after that minimum delay angle which is established by the delayed firing system.

The ignitron anode voltage sensing equipment serves to overcome that which has been a serious disadvantage of separate excitation types of firing systems. The apparatus thus far described will function satisfactorily but is subject to possible misfiring with highly inductive loads. Thus, if the load current trails the load voltage due to the inductive reactance of the load, the ignitron which is fired during one-half cycle may continue to conduct even though the phase of the line voltage has reversed. Under this circumstance the voltage across the second ignitron may not rise sufficiently to permit firing of that ignitron until some time after the line voltage itself actually switches polarity. If this condition exists, it is possible for the system to misfire since the self-excitation firing system would discharge capacitor 20C or 21C into the igniter circuit at the appropriate time even though the anode voltage of the associated ignitron may not have risen sufficiently to permit firing, and it is possible for the energy stored in the capacitor to be fully dissipated before the anode voltage rises adequately to permit conduction in the ignitron. The ignitron anode voltage sensing system obviates this possible malfunctioning.

Upon the closure of the no-weld control switch NWCR (FIG. 1a) primary winding T5P is connected between the anodes of the two ignitrons IG1 and IG2 in series with a pair of protective fuses. The voltage across that winding will therefore vary in accordance with the difference between the voltages at the anodes of the two ignitrons. When the anode voltage of either ignitron rises with respect to the other, a voltage is induced across the secondary winding T5S, and the ignitron anode voltage sensing control transfers the voltage on lead 12 from positive 12 volts essentially to ground potential. This voltage is applied to the bases of transistors Q17 and Q19 to enable both of those driving circuits to actuate their associated firing circuit. However, this does not occur until the voltage between the anodes of the two ignitrons has actually changed and been sensed so as to prevent the above-noted misfiring.

The alternating current signal appearing across the secondary winding T10S, see FIG. 1b, is synchronized with the source S1. This signal is full-wave rectified by rectifiers 10RE and 11RE and applied through resistor 65R to one electrode of rectifier 15RE, the other electrode of which is connected to a source of negative potential. Rectifier 15RE prevents the voltage on conductor 32 from becoming more negative than a selected value, such as negative 12 volts. If the magnitude of the voltage of the negative peaks of the full-wave rectified signal be large relative to that selected negative 12 volt value, then the voltage on conductor 32 will be in the form of a negative 12 volt signal with a positive-going (to ground) spike each 180°.

This signal is applied through resistor 72R at the base of transistor Q10, that base being connected to a suitable source of positive potential through resistor 82R. Transistors Q10 and Q11 are interconnected as a multivibrator in a form of Schmitt trigger circuit, with the collector of transistor Q10 being coupled to the base of transistor Q11 via a network comprising capacitor 25C and resistors 44R and 22R, and with the emitters of the two transistors being coupled via resistor 63R. When the voltage on conductor 32 is at the negative 12 volt level, transistor Q10 is held in a non-conductive state and transistor Q11 is conducting. At the positive-going input signal applied via conductor 32 to the base of transistor Q10, transistor Q10 begins to become conductive and as a result of the coupling between transistors Q10 and Q11, transistor Q10 becomes fully conductive very rapidly and transistor Q11 is driven below cutoff. The magnitude of the input voltage to the base of transistor Q10 at which this triggering will occur is quite precise and repetitive and the point at which the triggering occurs in relation to the voltage of source S1 can be precisely selected by selection of the parameters of the trigger circuitry, by selection of the turns ratio of transformer T10 to control the magnitude of the A.C. voltage across secondary winding T10S, and by selection of the magnitude of the negative biasing voltage applied to rectifier 15RE. In a constructed arrangement, with 115 volts across the secondary winding T10S, the circuit comprising transistors Q10 and Q11 was accurately triggered 10° in advance of the zero degree point (and the 180° point) on the A.C. waveform, transistor Q10 being rendered conductive and transistor Q11 being rendered non-conductive.

The trigger remains in this condition until the positive signal diminishes toward the selected negative 12 volt point and in the constructed embodiment, this occurred at about 10° after the zero degree point (and the 180° point) of the waveform of the source S1. At that time, transistor Q10 again becomes non-conductive and transistor Q11 again becomes conductive. When transistor Q11 is conducting, its collector voltage is at a relatively low value, approaching ground. When transistor Q11 is non-conductive, at each pulse on conductor 32, its collector voltage is at a higher voltage such as 12 volts positive. Consequently, during the operation of the circuit, conductor 34 is supplied 120 times per second with a positive-going (from ground to positive 12 volts) essentially square-wave pulse of relatively short (e.g., 20°) duration and having its leading edge accurately related to and in advance of (e.g., 10°) the zero degree point (and 180° point) on the A.C. waveform of source S1.

These pulses are applied to the base of transistor Q12 by a network comprising capacitor 9C and resistors 61R and 45R. Transistor Q12 is rendered conductive by each such pulse to apply a corresponding series of negative-going pulses to a multivibrator circuit comprising transistors Q14 and Q15 via a network including capacitor 10C and rectifier 5RE. Transistor Q14 is normally conducting and transistor Q15 is normally cutoff.

The base of transistor Q14 is taken negative by these negative going pulses. Transistors Q14 and Q15 are cross-coupled to form a flip-flop or multivibrator circuit, with the collector of transistor Q14 being coupled to the base of transistor Q15 by the network comprising capacitor 16C and resistor 28R and with the collector of transistor Q15 being coupled to the base of transistor Q14 by capacitor 15C and resistor 27R. The collectors of transistors Q14 and Q15 are connected to a source of positive potential through load resistors 16R and 15R, respectively, the bases of those transistors being respectively connected through resistors 36R and 37R to a source of negative potential, and the emitters being grounded. Transistors Q14 and Q15 conduct alternatively and desirably, means are provided for insuring that prior to the receipt of the described pulse, transistor Q14 is conducting effectively to saturation while transistor Q15 is cutoff. The cutoff of transistor Q15 to restore conduction in transistor Q13 and reduce the potential on lead 17 effectively to ground is the means to enable the drive circuits of transistors Q17, Q18, and Q19, Q20 so that one of the two ignitrons IG1 and IG2 fire to supply welding current to the work piece. The ignitron drive circuits are disabled by transferring transistor Q15 to conduct slightly ahead of the beginning of each half-cycle of line voltage (e.g., 10°) and are enabled at the time that transistor Q15 is cutoff as determined by the time constant of the resistance-capacitance network controlling unijunction transistor 2UJ. The timing network controlling the operation of unijunction transistor 2UJ is in circuit with the slope control circuit, yet to be described, and accordingly may be pre-biased to vary the time of initiation of unijunction 2UJ relative to the zero degree (or 180°) point on the A.C. waveform of source S1. This, of course, also affects the amount of welding current that flows.

At each of the short-duration negative-going pulses applied to the base of transistor Q14 by transistor Q12, transistor Q14 is turned off and transistor Q15 is turned on. When transistor Q15 is triggered to its conductive state, its collector voltage falls essentially to ground potential and this voltage is applied via conductor 15 and a network including resistors 43R and 47R to the base of transistor Q13 to block conduction of that transistor. As a result, the collector voltage of transistor Q13, at conductor 17, is approximately 12 volts positive. This signal is applied through resistor 50R to conductor 18 to disable the driving circuit comprising transistors Q17 and Q18 and is applied via resistor 51R to conductor 19 to disable the driving circuit comprising transistors Q19 and Q20. It will be noted that this occurs slightly (e.g., 10°) before the cycle commences.

When transistor Q14 is rendered non-conductive, just prior to the beginning of a cycle, the potential at its collector rises, and this rise is applied across the network comprising resistors 137R, 29R, and capacitor 2C. Capacitor 2C charges at a rate determined by the resistance of the charging network. Without any precharge being established across capacitor 2C, resistors 29R and 137R establish the minimum heat for which the system can be set.

Figure 2:
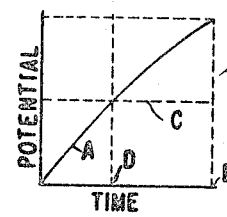
FIGURE 2 is a plot of the potential at the base of a transistor controlling the welding current in response to the controls of this invention.

However in a welding system which is equipped with slope control a variable prebias signal is provided to capacitor 2C, the magnitude of the prebias signal being variable with the progression of the weld cycle, and accordingly augments the charging potential supplied thereto by way of transistor Q14. In the above manner a variable base, or precharge potential, is provided from which capacitor 2C charges to the firing potential of unijunction 2UJ according to the predetermined slope control desired. As shown in FIG. 2 by the curve A the charging curve of condenser 2C has a given slope which is essentially a straight line if considered near the origin for a given amount of series resistance. The charging period required to reach breakdown for 2UJ with no potential initially imposed is represented by the distance along the time axis from the origin to the point B. When an intermediate base potential is established as represented by curve C, the charging interval required to reach the breakdown of 2UJ is reduced to that represented by D–B on the time axis. A reduction in this interval causes the ignitrons to be fired earlier in their cycle and increases the welding current applied to the work piece. Therefore, with no slope control, and therefore no slope control signal being generated at the anode of diode 41RE and with transistor Q14 conducting at saturation its collector is essentially at ground potential, and no base potential or initial charge level will be applied to capacitor 2C by way of resistors 137R and 29R. However, with slope control the charge slope of condenser 2C can be adjusted by application of a variable precharge signal, dependent upon the particular point of the weld cycle at which the system is operating, to change the initial voltage level at junction 35. The manner of varying the precharge on condenser 2C in accordance with the desired slope control will now be described in detail.

In general a slope control signal, as shown by waveform FF at FIG. 3, is developed across a charging condenser 3C, see FIG. 1a, by providing a plurality of charge and discharge paths therefor. Accordingly, an initial heat charge path is provided to establish the base from which the Up-Slope interval will charge at a predetermined point in the weld cycle. Upon reaching a predetermined point in the weld cycle an additional charge path will be provided to the timing condenser 3C to establish the rate of charge of the Up-Slope interval. Condenser 3C will remain at this new level for the remainder of the Weld-Heat interval, whereupon at a predetermined point the Down-Slope interval will automatically commence. The end of the Weld-Heat intervals will result in a discharge path being provided to condenser 3C to result in a discharge thereof until a predetermined final heat level is attained. The discharge of condenser 3C at the end of the weld heat interval provides the desired Down-Slope interval. Upon the final heat level being attained the discharge path for condenser 3C is removed to prevent any further discharge. This slope control signal is then reflected to the system main timing condenser 2C by way of signal limiting circuitry. In turn the slope control circuitry is effective during the time that the delayed firing control is establishing a ground potential on lead 10 to control the inhibition interval of the ignitron contactors.

The adjustable weld timer 5 which was described above in connection with the generation of the weld signal, for initiation of the delayed firing control, also generates the system control signal, the uppermost waveform of FIG. 3. The waveform immediately following the system control signal is the aforementioned weld signal. The interval of time extending from the leading edge of the system control signal and the leading edge of the weld signal is called squeeze time, and it is during this time that the electrode tips of the welder are moved into contact with the work piece. Objectionable electrode splatter may occur if a substantial amount of current were permitted to flow upon immediate contact of the electrodes with the work piece and therefore, an initial low level heat may be desirable. Accordingly, variable resistor VR2 of FIG. 1a determines the magnitude of the initial heat during the squeeze time. The rate of the Up-Slope is variable in accordance with the resistance setting of variable resistor VR3. The setting of VR4 determines the duration of the Weld-Heat interval, which of course includes the Up-Slope interval, and which commences with the leading edge of the weld signal. The Up-Slope heat control feature can be entirely removed by switch DPDT1. With DPDT1 in the position shown the Up-Slope heat control feature is in the system, and with DPDT1 in position to make the other set of contacts the Up-Slope feature will be removed. It should be understood that with the elimination of the Up-Slope interval the welder current will start at its upper limit upon the commencement of the Weld-Heat interval.

The primary control on the amount of precharge in capacitor 2C during the Weld-Heat interval following the Up-Slope time, and which of course will establish the amount of heat generated at the work piece during this interval, is achieved by the level of the reference at the anode of diode 41RE as established by the setting of VR7. A limit on the magnitude of precharge established on 2C during the Weld-Heat interval is established by adjustment of VR8 which corresponds to a power factor adjustment. The rate of reduction of the weld current from the high level attained during the Weld-Heat time down to the final heat level, Down-Slope interval, is established by resistance setting of variable resistor VR5. VR6 establishes the magnitude of the weld current during final heat time. Lastly, the Down-Slope feature can be eliminated by the opening of switch SPST1. Specifically, with switch SPST1 in the closed position the Down-Slope feature is a part of the system, and with SPST1 in its open position the Down-Slope feature will be eliminated. The elimination of the Down-Slope feature will eliminate the final heat time and instead the high weld current established during Weld-Heat time will continue to flow until the end of the weld cycle.

The system control signal, see FIG. 3, generated by a suitable weld timer 5, is applied by way of a series resistor 91R and 92R to the base of normally cutoff transistor Q21. The other end of 92R is connected to a source of minus 12 volts to keep Q21 in its cutoff state in the absence of the system control signal. The emitter of Q21 is grounded, and the collector thereof is connected to a positive 12 volts source by way of resistor 93R. The application of the system control signal to the base of Q21 results in the collector potential immediately falling to approximately ground potential.

Q22 and Q23 with their associated resistors 94R, 96R, 97R, 98R, 99R, 101R, and cross coupling capacitors 29C and 30C form a conventional multi-vibrator circuit. The multi-vibrator is arranged so that initially Q22 is conducting and Q23 is cutoff. The drop in potential experienced at the collector of Q21 is transmitted by way of coupling condenser 28C and diode 30RE to the base of Q22 to turn it off and place Q23 in its on state. The turning off of Q22 results in its collector potential rising to its upper limit. This is depicted in waveform labeled BB in FIG. 3.

The slope network shaping condenser 3C is tied to the system control signal by way of series connected diode 34RE and resistor 106R. Accordingly, to begin condenser 3C has no charge stored in it, see waveform labeled FF at FIG. 3. However, upon the occurrence of the leading edge of the system control signal, see waveform BB of FIG. 3, and with the DPDT1 switch in the position shown, indicating the presence of Up-Slope in the system, the condenser 3C will charge up to a value dependent upon the resistance setting of variable resistor VR2. With the system control signal at its upper positive limit diode 34RE will have 12 volts at its cathode and accordingly will be reverse biased. The cutting off of diode 34RE assures that condenser 3C will charge up to a percentage of the voltage rise experienced at the collector of Q22, as established by the voltage divider network comprising 107R, VR2 and 109R. Further, since 3C does not have any precharge stored therein the diode 33RE will be forward biased upon the cutting off of Q22 to apply the charging current to condenser 3C. These above conditions result in condenser 3C being charged to the initial heat value so labeled in waveform FF of FIG. 3. This initial heat signal generated by condenser 3C is then transmitted to the charging condenser 2C to place a precharge thereupon and affect the amount of weld current flow at the work piece WP. The voltage developed across condenser 3C will be applied to condenser 2C by way of cascaded transistors Q30, Q31, resistor 136R, VR7 and diode 41RE. The amount of precharge placed at 2C may be further limited by the weld heat magnitude adjustable resistor VR7, and a further limit may be established thereupon by the power factor resistor VR8.

The generation of the weld signal by timer 5, which is applied to the delayed firing control circuit over line 20, results in a signal, having a waveform as shown in FIG. 3, being applied to the base of normally non-conducting transistor Q24, by way of resistance network 111R, and 112R. Resistor 112R has one end thereof returned to a cutoff potential of minus 12 volts. The emitter of Q24 is grounded, and the collector thereof is returned to a positive 12 volts by way of resistor 113R. Q24 will go into conduction upon the application of the positive going leading edge of the weld signal to the base thereof to result in an immediate drop in potential at the collector thereof from its non-conducting level of approximately 12 volts to its conducting level of approximately zero volts. Furthermore, the collector of Q24 will remain at approximately zero volts for the duration of the weld signal. Q25 and Q26 along with the resistors 114R, 116R–119R, 121R and coupling condensers 33C and 34C form a conventional multivibrator circuit which has, in its quiescent state, Q25 conducting and Q26 cutoff. Since Q25 is normally conducting its collector will be at approximately zero volts, but upon the conduction of Q24 the drop in potential experienced at the collector thereof will be transmitted via condenser 32C and diode 35RE to the base of Q25 to result in a cutting off of transistor Q25. The cutting off of transistor Q25 results in the collector potential thereof rising to approximately 12 volts, see waveform AA of FIG. 3.

The positive potential developed at the collector of Q25 is then transmitted to the anode of diode 32RE over line 25. Since at this time condenser 3C will have a voltage thereacross equal to the value of the desired initial heat a bias voltage will be applied to the cathode of diode 32RE by way of the Up-Slope rate adjusting variable resistor VR3 and resistor 108R. However, since the potential applied to the anode of diode 32RE is positive with respect to its cathode it will be in a forward conducting state and accordingly an additional charging current, cumulative to that already being supplied thereto over the initial heat charge path, hereinabove described, will flow. Therefore, a further rise in potential will occur across 3C and the rate thereof, which defines the desired Up-Slope rate of the system, is controlled in accordance with the setting of variable resistor VR3. This Up-Slope time is shown in FIG. 3 at the waveform labeled FF. Further, in a manner similar to that described above in connection with the initial heat interval the Up-Slope interval will apply a gradually increasing prebias potential to condenser 2C over the slope output circuit comprising transistors Q30, Q31, resistor 136R, variable resistors VR7 and VR8, and diodes 41RE and 42RE.

As explained above the Weld-Heat time of the system is initiated at the beginning of the weld signal, which initiates the Up-Slope charge path circuitry, and extends for an interval as established by variable resistor VR4. Series connected VR4, resistor 123R and condenser 1C form the timing network which establishes the duration of the Weld-Heat interval, for, as shown in FIG. 1, the rise in potential experienced at the collector of Q25, which initiates the Up-Slope interval, is applied to one end of the variable resistor VR4, and one terminal of condenser 1C is grounded. The other terminal of condenser 1C is connected to the single rectifying contact, emitter, of unijunction transistor 1UJ. One base of 1UJ is connected to a positive 12 volts potential by way of resistor 124R, and the other base is connected to ground by way of resistor 125R. With VR4 set at its minimum value, resistor 123R establishes the smallest Weld-Heat interval possible, and accordingly increases in the resistance setting of VR4 increases the duration of the Weld-Heat time. Therefore, after an elapsed time as determined by the total of the resistor 123R and the resistance established by the setting of VR4 the charge across 1C will build up to the firing level of 1UJ to result in a rise in potential across resistor 125R. This rise in potential at 125R is transmitted by way of coupling condenser 38C to the base of Q27. Q27 is normally held in its cutoff state by the voltage divider formed by resistors 125R, 126R, and 127R. The emitter of Q27 is grounded and the collector thereof is returned to a positive 12 volts by way of load resistor 128R. Therefore under no signal conditions the collector of Q27 is at approximately 12 volts and the potential thereat drops to approximately zero volts upon the application of a positive going pulse developed by the unijunction transistor 1UJ to the base thereof. The negative going signal at the collector of Q27 is transmitted via coupling condenser 39C to the forwardly biased diode 36RE and from there to the base of then conducting transistor Q26 to result in a cutting off of conduction thereof. The application of the negative signal to the base of Q26 results in the multi-vibrator reverting back to its initial state wherein Q25 is conducting and Q26 is cutoff. Upon Q25 reverting back into a conducting state the potential at the collector thereof will drop to approximately zero volts, see AA of FIG. 3. The fall time of waveform AA marks the end of the Weld-Heat interval.

The drop in potential at the collector of Q25 is transmitted to the anode of diode 32RE. However, since condenser 3C now has built up a charge of greater magnitude, a substantially higher potential will be applied to the cathode of diode 32RE, and accordingly 32RE is placed in a cutoff state. The negative going trailing edge of waveform AA is also applied by the way of line 25, coupling condenser 31C and diode 31RE to the base of Q23 to result in a cutting off of conduction thereof and a turning on of transistor Q22. This results in the collector potential of transistor Q22 dropping to approximately zero volts, see waveform BB of FIG. 3. Accordingly both the initial heat charging path and the Weld-Heat charge path will have been removed from condenser 3C.

At this point let us backtrack a bit to view the action of transistor Q29. The potential established at the collector of transistor Q26 supplies the gating signal for transistor Q29. The signal generated at the collector Q26 is applied to the base of Q29 by way of resistor 129R. Q29 is accordingly held in a conducting state in the absence of any signal by way of the voltage divider formed by resistors 118R, 129R, and 130R, the base of Q29 being connected to the junction point between resistors 129R and 130R. The emitter of Q29 is connected to ground, and the collector thereof is returned to positive 12 volts by way of resistor 131R. The signal developed across the collector of Q29 is transmitted by way of resistor 132R, switch SPST1, diode 37RE, resistor 133R and variable resistor VR5 in the manner shown. A limitation on the amount of collector signal transmitted is set by the diode 38RE–VR6 combination which has the cathode of diode 38RE connected at the junction of resistor 132R and a terminal of SPST1. The anode of 38RE is connected to the variable arm of the VR6, which in turn has one of its resistance terminals connected to a positive 12 volts and its other to ground. Accordingly, depending upon the amount of final heat desired, and if none is desired the setting of VR6 should be such that zero volts will be applied to the anode of diode 38RE, a biasing level at the cathode of diode 37RE will be established to render it cutoff for values equal to or below that level but conductive for all values above the desired set level.

Accordingly upon the conduction of transistor Q26, which marks the start of the Up-Slope time, a negative going signal is applied to the base of transistor Q29 to result in a cutting off thereof. This results in a rise of potential at the collector of Q29 from a normal zero volt level to approximately positive 12 volts. This rise in potential will remain for the duration of the Weld-Heat interval, and accordingly, so as to not affect the magnitude or slope of the Up-Slope time, diode 37RE is rendered non-conductive to isolate condenser 3C from this portion of the circuit. However, upon the firing of 1UJ, which marks the limit of the duration of the Weld-Heat interval, the potential of Q26 rises to approximately 12 volts and this rise is transmitted to the base of Q29 to result in a turning on thereof, see waveform DD of FIG. 3. Upon the turning on of Q29 the collector potential thereof drops to approximately zero volts to place diode 37RE in a forward conducting state, and accordingly supply a discharge path for the charge accumulated across condenser 3C. Condenser 3C will thereafter discharge by way of variable resistor VR5, which establishes the rate of the Down-Slope time, resistor 133R, diode 37RE, switch SPST1, resistor 132R and the collector-emitter path of transistor Q29 to ground. This discharge will continue for so long as diode 37RE is in a forward conducting state, which is established by the final heat setting of VR6. Therefore a discharge path will be provided for the voltage accumulated at condenser 3C above the final heat level desired, whereas upon the voltage at 3C reaching the desired final heat level diode 37RE will be back-biased to eliminate the discharge path and therefore leave the desired amount of final heat charge accumulated on condenser 3C. This results in a Down-Slope curve as shown in waveform FF of FIG. 3.

The waveform FF, as developed across condenser 3C will be applied concurrently with its development to the base of transistor Q30. Transistors Q30 and Q31 are connected together in direct coupled, cascaded fashion to result in a signal at the emitter of transistor Q31 which is substantially the same as that applied to the base of Q30. The emitter of Q31 is connected to ground potential by way of the series connected resistor 136R, variable resistor VR7, and resistor 139R. The selectively positionable arm of VR7 is connected by diode 42RE to the selectively positionable arm of variable resistor VR8. VR8 having one of its resistance terminals connected by way of resistor 138R to a positive 12 volts, and its other terminal connected to ground. The junction formed by the selectively positionable arm of VR7 and the anode of diode 42RE is connected to the anode of diode 41RE. The cathode of diode 41RE is connected by way of resistor 137R to the collector of transistor Q14, and is connected by way of resistor 29R to the main charging condenser 2C.

Not all of the slope control signal developed by condenser 3C need be applied to recharge condenser 2C, and, in fact, only the amount as established by the percent heat variable resistor VR7 will be transmitted thereto. Further, an absolute limit on the voltage level is afforded by rectifier 42RE and variable resistor VR8. VR8 develops a positive voltage to ground which is applied to the cathode of diode 42RE to result in a reverse bias thereat at the voltage limit desired. Any positive voltage at the anode of 42RE in excess of the limit established by the setting VR8 will be passed to ground. Variable resistor VR8 thereby provided a limit on the bias voltage which can be developed in the slope circuit for application to junction 35 and thus the establishment of an upper limit on the voltage base from which the charging of condenser 2C towards the firing potential of unijunction transistor 2UJ is initiated. The adjustment provided by variable resistor VR8 constitutes the power factor adjustment.

With the slope control circuitry as described the minimum heat will be applied to the work piece during the initial heat and final heat portions. Upon the generation of the initial heat level at condenser 3C a voltage signal having the same waveform but a magnitude equal to the setting of variable resistor VR7 and VR8 will be applied to the anode of rectifier 41RE. Now assuming that at this time Q14, see FIG. 1b, is in a conducting state and thus placing the cathode of diode 41RE at approximately zero volts, this will result in the placing of a low potential at condenser 2C. Accordingly the base from which 2C starts its rise upon a suitable signal application at secondary T10S will be relatively small. Therefore, all other conditions being met, the length of time necessary for 2C to charge up to the triggering level of the unijunction 2UJ and accordingly apply a cutoff signal to Q15, which in turn, controls the firing of the appropriate unijunction will be long. As explained above, a small precharge at condenser 2C will result in an advance of the firing of the ignitrons with no substantial increase in the welding current. On the other hand, a large precharge signal as established by the slope control circuit, will result in a substantial advance of the firing of the ignitrons and a resulting substantial increase in the welding current. It should of course be appreciated that the only time that a weld current will flow at the output of the ignitron contactor is when lead 10 is at ground potential, and accordingly if the weld signal is not present to place lead 10 at ground potential for any of the initial heat, or final heat intervals no output current will flow.

Therefore, dependent upon the stage of the weld cycle to which operations have progressed a precharge voltage on condenser 2C by the slope control circuit through junction 35 and to the emitter of unijunction transistor 2UJ will be established. One base electrode 44 of 2UJ is applied to a source of positive potential by way of resistor 2R, and the other base electrode, 45, will be connected to ground through a resistor 3R. When the voltage across condenser 2C rises to a sufficient value, the impedance of the unijunction device 2UJ between the emitter and base electrode 45 abruptly falls and capacitor 2C discharges over a path including the emitter, base 45 and resistor 3R. This applies a positive going pulse to the base of transistor Q16 through a network comprising the resistors 13R and 39R and capacitor 12C. Transistor Q16 is rendered conductive and desirably saturates, and its collector voltage drops from, say, 12 volts to approximately ground potential to develop a negative going pulse which is applied through condenser 11C and rectifier 6RE to the base of transistor Q15 to restore the triggering circuit comprising the transistors Q14, Q15 to their original state. The reestablishment of conduction in transistor Q14 effectively removes the charging source for condenser 2C. The termination of conduction through transistor Q15 results in the application of ground potential via conductor 15 and resistor 43R to the base of transistor Q13 to cause that device to become fully conductive. As a result, its collector voltage at conductor 17 drops substantially to ground potential which is communicated to conductors 18 and 19 through resistors 50R and 51R to enable the driving circuits and the firing circuits to fire the ignitrons IG1 and IG2, as far as this control is concerned. Therefore, in the normal operation of the circuit, all of the other conditions necessary for the enabling of one of the two firing circuits to operate have normally been met prior to the receipt of this slope control signal so that normally it is the application of ground potential to conductor 18 or 19 which actually produces the firing of the appropriate one of the two ignitrons IG1 and IG2 to thereby control the amount of heat generated at the work piece.

While it will be apparent that the embodiment of this invention herein disclosed is well-calculated to fulfill the objects of the invention, it will be appreciated that the invention is susceptible to modification, variation and change without departing from the proper scope of fair meaning of the subjoined claims.

Having described the invention, I claim:

1. In a system having a pair of anti-parallel connected unidirectional current conducting devices actuatable in response to input signals to connect a source of electrical energy of alternating polarity to a load circuit, the combination of a separate-excitation firing circuit means for each of the unidirectional current conducting devices, each excitation circuit comprising a source of energy and controllable means effective when actuated for applying a pulse of energy from said source of energy to the input circuit of the associated unidirectional current conducting device, actuating means for selectively actuating said controllable means, inhibiting means for said actuating means operated in synchronism with the source of alternating potential, means rendering said inhibiting means effective during each cycle of said alternating potential, means including an RC charge path effective during each cycle of said alternating potential to generate a voltage increasing in amplitude during each of said cycles, said voltage reaching a predetermined threshold level for rendering said inhibiting means ineffective after a period of elapsed time, and means for progressively varying the time required for said increasing amplitude voltage to reach said predetermined threshold level of said inhibiting means during each of a successive series of cycles of said alternating potential including means for generating a Slope control signal conforming substantially to the weld current desired from said unidirectional current conducting devices over said series of cycles for each cycle of said alternating source making up the weld cycle, said Slope control signal being combined with said increasing amplitude source to thereby alter the starting potential thereof and accordingly decrease the time needed for attaining the threshold level of said inhibiting means.

2. In a system having a pair of anti-parallel connected unidirectional current conducting devices actuatable in response to input signals to connect a source of electrical energy of alternating polarity to a load circuit, the combination of a separate-excitation firing circuit means for each of the unidirectional current conducting devices each comprising a source of energy and controllable means effective when actuated for applying a pulse of energy from said source of energy to the input circuit of the associated unidirectional current conducting device, actuating means for selectively actuating said controllable means, inhibiting means for said actuating means operated in synchronism with the source of alternating potential, means rendering said inhibiting means effective during each cycle of said alternating potential, means including a resistor-condenser charge path effective during each cycle of said alternating potential to generate a voltage increasing in amplitude during each of said cycles, and means for generating a progressively variable Slope control signal that is in substantial conformity with the Weld current desired, the condenser of said RC charge path being prebiased in each cycle of operation during each of a successive series of cycles of said alternating potential an initial amount differing from the prebias of its preceding cycle in accordance with the concurrent magnitude of voltage of said Slope control signal to accordingly reduce the time required for reaching said threshold level of said inhibiting means over said series of cycles and controlling the interval said inhibiting means is effective.

3. A slope control circuit for welding apparatus having periodic outputs of welding current over the entire weld cycle comprising, means periodically defining a disabled interval of predetermined length for said apparatus, the periodic current output of said apparatus being inversely related to the length of said interval, means for generating a progressively variable control signal conforming substantially to the welding current desired during any given period of said weld cycle, means for limiting the magnitude of said variable control signal to a different magnitude during each of a successive series of said periodic disabled intervals, a unijunction transistor for energization of said interval defining means when placed in negative resistance operation, means including a timing condenser having a precharge potential thereacross at any given time equal to the signal level from said limiting means, a periodic charging signal of uniform character for said condenser synchronized with said periodic output of said welding apparatus, said combined precharge signal and said charging signal reaching the threshold level of said unijunction transistor to drive it into negative resistance operation at predetermined variably occurring points of said cycles over said series of cycles, said disabled interval being of predetermined length and inversely related to the precharge potential across said condenser.

4. A welding system having a pair of ignitrons connected in anti-parallel relation between a source of alternating current and a load, separate excitation firing means for applying pulses of energy to the input circuits of the ignitrons in selected phase relation to the source, a controllable actuating means for said firing means, inhibiting means operable in synchronism with the alternator source for inhibiting said actuation means, means rendering said inhibiting means effective, means generating an increasing amplitude potential operating in synchronism with the alternating source, said potential reaching a threshold level to render said inhibiting means ineffective after a predetermined time, and means for generating a slope control signal having a progressively variable waveform during each of a successive series of cycles of said alternating current source substantially conforming to the welding current desired over the entire weld cycle, said slope control signal being combined with said increasing amplitude potential to thereby decrease the time required for said last mentioned potential to reach the threshold level of said inhibiting means in proportion to the magnitude thereof.

5. A slope control circuit for welding apparatus producing a variable weld current during different intervals of a weld cycle comprising, means defining an interval of controllable length, the output current of said apparatus being inversely related to the length of said interval, said means being responsive to an interval control signal of a predetermined magnitude for termination thereof, means for generating a control signal which progressively varies in magnitude during at least one portion of said weld cycle and which conforms substantially to the desired current output over the entire weld cycle, means generating an initiating signal whose amplitude is increasing over the time duration of the interval, interval control signal generating means including means for accumulating said variable control signal and said initiating signal to generate a signal of predetermined magnitude at a time during each interval proportional to the concurrent magnitude of said control signal.

6. A slope control circuit for welding apparatus producing a variable weld current during different periods of a weld cycle comprising, means defining an interval of controllable length, means for generating a control signal which progressively varies in magnitude during at least one portion of said weld cycle and which conforms substantially to the desired current output over the entire weld cycle, means for generating an initiating signal which builds up with time, means for cumulatively combining said variable control signal and said time dependent initiating signal to produce an interval control signal of predetermined amplitude which can occur at any time during the interval depending upon the concurrent magnitude of said control signal, said interval defining means being responsive to said interval control signal to accordingly control the length thereof.

7. In a welding apparatus having a pair of anti-parallel connected unidirectional current conducting devices, actuating means for connecting a source of electrical energy of alternating polarity to a load circuit, said actuating means including separate-excitation firing circuit means for each of the unidirectional current conducting devices, each of said excitation firing circuits including a source of energy and controllable means effective when actuated for applying a pulse of energy from said source of energy to the input circuit of the associated unidirectional current conducting device, actuating means for selectively actuating said controllable means, inhibiting means for said actuating means operated in synchronism with the source of alternating energy effective during each half cycle of said energy, a voltage variable with the duration of each cycle of said energy and reaching the triggering level of said inhibiting means after an elapsed time to render said means ineffective, and slope control means effective to control the effective interval of said inhibiting means by adjusting the starting voltage level from which said variable voltage starts its rise to accordingly affect the time needed to reach the triggering level of said inhibiting means comprising, means including a timing condenser for accumulating a voltage thereacross which substantially conforms to the output weld current desired from said unidirectional current conducting devices, a first charge path for said timing condenser resulting in a signal having a rate of charge conforming to the desired Up-Slope weld current, said condenser thereupon remaining at a constant voltage level for a remainder of the Weld-Heat portion of the weld cycle, presettable means for initiating a discharge path after the desired interval of Weld-Heat time, which discharge path will result in said voltage accumulated across said timing condenser being discharged at a predetermined rate of charge conforming substantially to the desired Down-Slope weld current, circuit means for limiting the magnitude of said slope control voltage, means for combining said limited slope control voltage to said variable voltage to thereby alter the time needed by said variable voltage to reach the threshold level of said inhibiting means in accordance with the magnitude of said slope control signal during any given cycle of operation and thereby result in a controllable and variably occurring inhibiting interval.

8. In a welding apparatus having a pair of anti-parallel connected unidirectional current conducting devices, actuatable in response to input signals to connect a source of electrical energy of alternating polarity to a load circuit, the combination of a separate-excitation firing circuit means for each of the unidirectional current conducting devices, each excitation circuit comprising a source of energy and controllable means effective when actuated for applying a pulse of energy from said source of energy to the input circuit of the associated unidirectional current conducting device, actuating means for selectively actuating said controllable means, inhibiting means for said actuating means operated in synchronism with the source of alternating potential, means rendering said inhibiting means effective during each cycle of said alternating potential, a unijunction transistor for rendering said inhibiting means ineffective when placed in negative resistance operation, means for placing said unijunction transistor into negative resistance operation including, a first timing condenser, a charge path for said first timing condenser operable during each cycle of operation, said first condenser effective upon reaching a predetermined level of voltage to trigger said unijunction transistor into negative resistance operation, said first condenser reaching the triggering level of said unijunction late in each cycle of said alternating potential to result in a relatively low current flow to said load circuit, and means to place a precharge upon said first timing condenser to accordingly reduce the length of time needed for said condenser to attain the firing level of said unijunction comprising, a second timing condenser, means for initiating a first charge path for said second timing condenser at a given point of a weld cycle to result in an Up-Slope rate of charge to a first given level of voltage thereacross, said second condenser remaining at said first level of voltage for a predetermined time whereupon a discharge path is provided therefor, said second discharge path having a resistance selectively chosen to provide a given Down-Slope rate of discharge to a final level, circuit means for applying said various voltage levels accumulated across said second timing condenser to said first condenser to serve as a precharge therefor.

9. In a welding apparatus having a pair of anti-parallel connected unidirectional current conducting devices, actuating means for connecting a source of electrical energy of alternating polarity to a load circuit, said actuating means including separate-excitation firing circuit means for each of the unidirectional current conducting devices, each of said excitation firing circuits including a source of energy and controllable means effective when actuated for applying a pulse of energy from said source of energy to the input circuit of the associated unidirectional current conducting device, actuating means for selectively actuating said controllable means, inhibiting means for said actuating means operated in synchronism with the source of alternating energy effective during each half cycle of said energy, a voltage variable with the duration of each cycle of said energy and reaching the triggering level of said inhibiting means after an elapsed time to render said means ineffective, and slope control means effective to control the effective interval of said inhibiting means by adjusting the starting voltage level from which said variable voltage starts its rise to accordingly affect the time needed to reach the triggering level of said inhibiting means comprising, means including a timing condenser for accumulating a voltage thereacross which substantially conforms to the output weld current desired from said unidirectional current conducting devices, a first charge path including a first differentially settable means for establishing the desired initial heat magnitude for said timing condenser resulting in said condenser being charged up to said pre-established initial heat level at a predetermined rate, means effective in response to a system control signal operatively connecting said first charge path to said timing condenser, a second charge path including a second differentially settable means for establishing the desired Weld-Heat magnitude for said timing condenser resulting in said condenser being charged thereto at a predetermined Up-Slope rate, means effective in response to a weld timing signal for operatively connecting said second charge path to said timing condenser, means including a third differentially settable means for determining the start of the Down-Slope interval and effective thereupon to generate a signal so indicating, a first discharge path including fourth differentially settable means for establishing the desired final heat level of magnitude for said timing condenser, said first discharge path being effective in response to the generation of said signal indicating the beginning of said Down-Slope interval, means including fifth and sixth differentially settable means for limiting the magnitude of the signal accumulated on said timing condenser at any given time in accordance with the desired system percent heat and power factor respectively, means for combining said limited slope control signal accumulated at said timing condenser to said variable voltage to thereby alter the time needed by said variable voltage to reach the threshold level of said inhibiting means in accordance with the magnitude of said slope control signal during any given cycle of operation and thereby resulting in a controllable and variably occurring inhibiting interval.

10. In a welding apparatus having a pair of anti-parallel connected unidirectional current conducting devices, actuatable in response to input signals to connect a source of electrical energy of alternating polarity to a load circuit, the combination of a separate-excitation firing circuit means for each of the unidirectional current conducting devices, each excitation circuit comprising a source of energy and controllable means effective when actuated for applying a pulse of energy from said source of energy to the input circuit of the associated unidirectional current conducting device, actuating means for selectively actuating said controllable means, inhibiting means for said actuating means operated in synchronism with the source of alternating potential, means rendering said inhibiting means effective during each cycle of said alternating potential, a unijunction transistor for rendering said inhibiting means ineffective when placed in negative resistance operation, means for placing said unijunction transistor into negative resistance operation including, a first timing condenser, a charge path for said first timing condenser operable during each cycle of operation, said first condenser effective upon reaching a predetermined level of voltage to trigger said unijunction transistor into negative resistance operation, said first condenser reaching the triggering level of said unijunction late in each cycle of said alternating potential to result in a relatively low current flow to said load circuit, and means to place a precharge upon said first timing condenser to accordingly reduce the length of time needed for said condenser to attain the firing level of said unijunction comprising, a second timing condenser, a first charge path for said second timing condenser including a first differentially settable means for establishing the desired initial heat magnitude therefor and resulting in said second timing condenser being charged up to said pre-established initial heat level at a predetermined rate, means effective in response to a system control timing signal operatively connecting said first charge path to said second timing condenser, means including a pair of direct coupled semiconductor devices and a pair of differentially settable means for limiting the magnitude of the signal accumulated across said second timing condenser at any given time in accordance with the desired system percent heat and power factor, for applying said signal accumulated across said second timing condenser to said first condenser to serve as a precharge therefor.

11. In a welding apparatus having a pair of anti-parallel connected unidirectional current conducting devices, actuatable in response to input signals to connect a source of electrical energy of alternating polarity to a load circuit, the combination of a separate-excitation firing circuit means for each of the unidirectional current conducting devices, each excitation circuit comprising a source of energy and controllable means effective when actuated for applying a pulse of energy from said source of energy to the input circuit of the associated unidirectional current conducting device, actuating means for selectively actuating said controllable means, inhibiting means for said actuating means operated in synchronism with the source of alternating potential, means rendering said inhibiting means effective during each cycle of said alternating potential, a unijunction transistor for rendering said inhibiting means ineffective when placed in negative resistace operation, means for placing said unijunction transistor into negative resistance operation including, a first timing condenser, a charge path for said first timing condenser operable during each cycle of operation, said first condenser effective upon reaching a predetermined level of voltage to trigger said unijunction transistor into negative resistance operation, said first condenser reaching the triggering level of said unijunction late in each cycle of said alternating potential to result in a relatively low current flow to said load circuit, and means to place a precharge upon said first timing condenser to accordingly reduce the length of time needed for said condenser to attain the firing level of said unijunction comprising, a second timing condenser, a first charge path for said second timing condenser including a first differentially settable means for establishing the desired Weld-Heat level of voltage therefor, and resulting in said second timing condenser being charged up to said pre-established Weld-Heat level at a predetermined Up-Slope rate, means effective in response to a weld timing signal for operatively connecting said first charge path to said timing condenser, means including a pair of direct coupled semiconductor devices and a pair of differentially settable means for limiting the magnitude of the signal accumulated across said second timing condenser at any given time in accordance with the desired system percent heat and power factor, for applying said signal accumulated across said second timing condenser to said first condenser to serve as a precharge therefor.

12. In a welding apparatus having a pair of anti-parallel connected unidirectional current conducting devices, actuatable in response to input signals to connect a source of electrical energy of alternating polarity to a load circuit, the combination of a separate-excitation firing circuit means for each of the unidirectional current conducting devices, each excitation circuit comprising a source of energy and controllable means effective when actuated for applying a pulse of energy from said source of energy to the input circuit of the associated unidirectional current conducting device, actuating means for selectively actuating said controllable means, inhibiting means for said actuating means operated in synchronism with the source of alternating potential, means rendering said inhibiting means effective during each cycle of said alternating potential, a unijunction transistor for rendering said ihibiting means ineffective when placed in negative resistance operation, means for placing said unijunction transistor into negative resistance operation including, a first timing condenser, a charge path for said first timing condenser operable during each cycle of operation, said first condenser effective upon reaching a predetermined level of voltage to trigger said unijunction transistor into negative resistance operation, said first condenser reaching the triggering level of said unijunction late in each cycle of said alternating potential to result in a relatively low current flow to said load circuit, and means to place a precharge upon said first timing condenser to accordingly reduce the length of time needed for said condenser to attain the firing level of said unijunction comprising, a second timing condenser having a charge accumulated thereacross equal to the desired system Weld-Heat level, a first discharge path including a first differentially settable means for establishing the desired final heat level of magnitude for said second timing condenser, and establishing the Down-Slope rate of discharge to said final heat level, means including a second differentially settable means for setting the point of the weld cycle at which said Down-Slope interval is initiated, and for connecting said second timing condenser to said discharge path, means including a pair of direct coupled semiconductor devices and a pair of differentially settable means for limiting the magnitude of the signal accumulated across said second timing condenser at any given time in accordance with the desired system percent heat and power factor, for applying said signal accumulated across said second timing condenser to said first condenser to serve as a precharge therefor.

13. In a welding apparatus having a pair of anti-parallel connected unidirectional current conducting devices, actuating means for connecting a source of electrical energy of alternating polarity to a load circuit, said actuating means including separate-excitation firing circuit means for each of the unidirectional current conducting devices, each of said excitation firing circuits including a source of energy and controllable means effective when actuated for applying a pulse of energy from said source of energy to the input circuit of the associated unidirectional current conducting device, actuating means for selectively actuating said controllable means, inhibiting means for said actuating means operated in synchronism with the source of alternating energy effective during each half cycle of said energy, a voltage variable with the duration of each cycle of said energy and reaching the triggering level of said inhibiting means after an elapsed time to render said means ineffective, and slope control means effective to control the effective interval of said inhibiting means by adjusting the starting voltage level from which said variable voltage starts its rise to accordingly affect the time needed to reach the triggering level of said inhibiting means comprising, a second timing condenser, means including first and second charge paths effective respectively in response to a system control timing signal and to a system weld signal for establishment of the magnitudes and the rates of reaching both the initial heat and Weld-Heat levels, a discharge path effective at a predetermined point of the weld cycle to determine the Down-Slope rate of discharge of said second timing condenser to a predetermined final heat level, and means including a pair of direct coupled transistors connected in emitter follower fashion, and a pair of differentially settable means for respectively limiting the magnitude available from said second timing condenser in accordance with the desired percent heat and system power factor, for applying said signal accumulated at said second timing condenser to said first condenser to serve a precharge therefor and thereby alter the time needed by said variable voltage to reach the threshold level of said inhibiting means in accordance with the amount of precharge available during any given cycle of operation and therefore result in a controllable and variably occurring inhibiting interval.

References Cited by the Examiner
UNITED STATES PATENTS

| | | | |
|---|---|---|---|
| 2,711,506 | 6/1955 | Johnsen et al. | 219—114 |
| 2,849,608 | 8/1958 | Large | 219—114 |
| 2,879,386 | 3/1959 | Scholtes | 328—73 |

ARTHUR GAUSS, *Primary Examiner*.

B. P. DAVIS, *Assistant Examiner*.